R. E. HARRIS.
LOCKING DEVICE FOR MOTOR VEHICLES.
APPLICATION FILED OCT. 14, 1920.
1,382,189. Patented June 21, 1921.
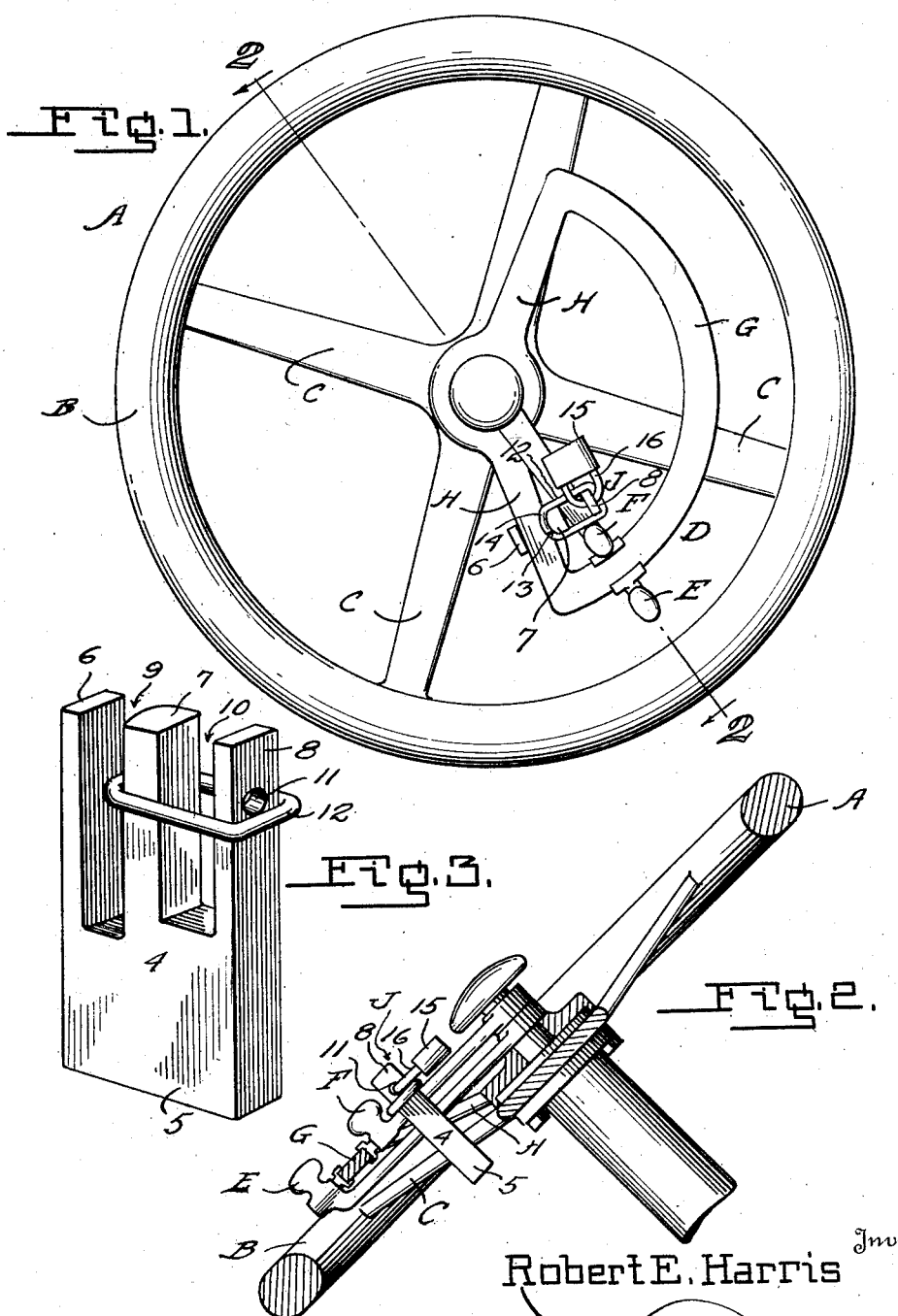
Robert E. Harris, Inventor

UNITED STATES PATENT OFFICE.

ROBERT E. HARRIS, OF EL PASO, TEXAS.

LOCKING DEVICE FOR MOTOR-VEHICLES.

1,382,189.	Specification of Letters Patent.	Patented June 21, 1921.

Application filed October 14, 1920. Serial No. 416,984.

*To all whom it may concern:*

Be it known that I, ROBERT E. HARRIS, a citizen of the United States, residing at El Paso, in the county of El Paso and State of Texas, have invented certain new and useful Improvements in Locking Devices for Motor-Vehicles, of which the following is a specification.

The present invention relates to locking devices for motor vehicles, such as automobiles and trucks, the equipment of which includes a steering wheel and levers for control of the motor or engine. These levers are disposed in close proximity to the steering wheel and are generally known as the "throttle lever" and "spark lever".

There are three principal arrangements of these devices, first that in which the throttle and spark levers are above the steering wheel and movable with respect to a quadrant common to both levers; second a similar arrangement but with the said levers below the steering wheel, and third that in which separate quadrants are provided for each lever all disposed below the steering wheel.

The invention herein disclosed is particularly well adapted for use on vehicles having the first mentioned arrangement of steering wheel and levers, but the principle is of general application to all three arrangements.

The principal objects of the invention are first, to provide locking devices which will limit circumferential movement of the steering wheels and prevent operation of the throttle levers, and in the present embodiment of the invention, prevent operation of the spark levers also; second to provide locking devices that may be readily placed into and removed from operative relation to the parts of the vehicles hereinbefore referred to; and third, to provide locking devices which are simple in formation and hence inexpensive to manufacture, and so shaped as to be efficient in that they maintain a locking position against attempted manipulation or prying.

The devices are adapted to limit circumferential movement of the steering wheel so that it would be practically impossible to steer the vehicle either if operating under its own power or towed since the amplitude of circumferential movement of the steering wheel when the locking device is in place, is not sufficient to steer the vehicle around right angular corners such as in the city and, as a matter of fact, permits only such steering as might be possible by manipulation of the steering wheels and the manual pushing and pulling of the vehicle forward and rearward to remove it from a point of danger, such as from in front of a burning building or to facilitate cleaning of streets or repairs to water and gas laterals beneath the pavement. A locking device of this character also permits of the shifting of vehicles equipped with the locking devices, from one place to another within or about a garage but thwarts attempts of unauthorized use.

Other objects and advantages of the invention will appear in the following detailed description, taken in connection with the accompanying drawings, forming a part of this specification, and in which drawings:

Figure 1 is a plan view of the steering wheel control levers and quadrant of a motor vehicle with a locking device formed and assembled according to the principle of my invention applied thereto.

Fig. 2 is a sectional view on the line 2—2 looking in the direction of the arrows.

Fig. 3 is a perspective view of the steering wheel, quadrant and control lever engaging means.

In the drawings, A designates the steering wheel of a motor vehicle, including a rim B and spokes C of the usual or any other approved contruction; D control device of the engine of the vehicle, in the example shown including throttle lever E, spark lever F and quadrant G supported by radial arms H all of which is disposed above the wheel A; and J a locking device shaped and constructed according to the principle of the invention.

The locking device J, in the present example includes a relatively flat body 4, elongated so that its one end portion 5 constitutes a projection, which when the device is in use, is disposed between the spokes C and limits the amplitude of circumferential movement of wheel A. This body has three fingers 6, 7 and 8 in spaced relation and preferably parallel in a row to provide ways 9 and 10 open at one end of the body for the reception of one of the radial arms H and the levers E and F when closely adjacent said arm and respectively in a closed and retarded position. The way 9 is relatively longer than the way 10 and the finger 8 is provided with a transverse aperture 11 for purposes subsequently to be set forth.

An element 12, preferably of endless band-like formation is adapted to embrace the fingers 7 and 8 and freely slide on and off the same when disposed with its plane at right angles to the axes of fingers 7 and 8 and to slide on said fingers so as to be disposed below the said aperture 11 as shown in Fig. 3 of the drawings. The face 13 of finger 7 confronting the way 9 is preferably rounded as shown in Figs. 1 and 3, and likewise a portion 14 of element 12 is also rounded to conform thereto, this for a purpose to be subsequently set forth.

A lock 15 such as a padlock, including an element 16, such as the shackle thereof is provided, the element 16 extending through aperture 11 to prevent unauthorized removal of the body 4 and element 12.

The device herein specifically described is particularly well adapted for use in connection with those motor vehicles where the levers E and F are above wheel A, and the quadrant G relatively flat and wide on top. In applying the locking device, the body 4 is moved upwardly from below the steering wheel A, between spokes C thereof, and so that the radial arm H of the quadrant G and levers E and F are disposed in ways 9 and 10, respectively. The finger 6 is then to one side of radial arm H; finger 7 at the other side of said arm H and between it and levers E and F; and the finger 8 at the opposite side of levers E and F from finger 7. The way 9 is relatively longer than way 10, since it receives the radial arm H of the quadrant which is usually lower than either lever E or F. The rounded face 13 of finger 7 permits the levers E and F to be held closely adjacent the end of the quadrant, or in other words, substantially in a closed and retarded position respectively.

After the body 4 is in place the element 12 is slipped into place embracing the fingers 7 and 8, after which the lock 15 is brought into use its element 16 passing through aperture 11 above element 12. This element 12 while not essential enables a smaller lock to be used without danger of unauthorized removal of the locking device by manipulation of the body 4, and these elements may be made of various thicknesses and the proper size selected for use with a particular arrangement to take up play between the lock element 16 and lever F.

When equipping a motor vehicle with a locking device such as herein disclosed, it is desirable to position the steering wheel A so that the projection 5 of body 4 is substantially midway between spokes C when the front ground wheels are straight forward. This will permit limited circumferential movement of wheel B to aid in the pushing and pulling of the vehicle away from a place of danger or where work is to be carried on, but not sufficient to permit of usual steering or towing.

Changes in details and proportions of characteristics of the main body portion of this invention may be made without departing from the spirit of this invention; but,

I claim:

1. In combination with a motor vehicle steering wheel including spokes and a control device for the motor including a lever and quadrant; a locking device including means for holding said lever in fixed relation to its quadrant and a projection between the spokes of said steering wheel to permit only limited circumferential movement of said wheel.

2. In combination with a motor vehicle steering wheel including spokes and a control device for the motor including throttle and spark levers and a quadrant common to both levers; a locking device including means for holding said levers in fixed relation to said quadrant and a projection between the spokes of said steering wheel to permit only limited circumferential movement of said wheel.

3. In combination with a motor vehicle steering wheel including spokes and a control device for the motor including a throttle lever in close proximity to the wheel; a locking device including means for holding said lever in a closed position and a projection between the spokes of said steering wheel to permit only limited circumferential movement of said wheel.

4. In combination with a motor vehicle steering wheel including spokes and a control device for the motor including a throttle lever and a spark lever in close proximity to said wheel; a locking device including means for holding said throttle lever in a closed position and said spark lever retarded, and a projection between the spokes of said steering wheel to permit only limited circumferential movement of said wheel.

5. A locking device comprising in combination a relatively flat elongated body formed with three parallel fingers separated to provide two ways open at one end of the body, one of said ways relatively longer than the other, an element embracing the two of said fingers bounding the smaller of said ways, one of said last mentioned fingers having a transverse aperture above said embracing element, and a lock having an element adapted to extend through said aperture and lock said embracing element against removal.

6. A locking device comprising in combination a relatively flat elongated body formed with three parallel fingers separated to provide two ways open at one end of the body, an element embracing the two of said fingers, one of said last mentioned fingers having a transverse aperture above said embracing element, and a lock having an element adapted to extend through said aperture and lock said embracing element against removal.

7. A locking device comprising in combination a relatively flat elongated body formed with three parallel fingers separated and in a row to provide two ways open at one end of the body, the middle of said fingers rounded at its face confronting one of said ways, an endless band like member adapted to embrace an outer and middle of said fingers and having a rounded portion to conform to the said rounded face of the middle finger, the other finger embraced by said band provided with a transverse aperture above said band and a lock having an element adapted to project through said aperture and lock said band against removal.

8. In a locking device, the combination with a motor vehicle steering wheel having spokes, and a throttle lever, a spark lever, and a quadrant including a radial support thereabove, of a body having a portion disposed between spokes of said wheel to limit the amplitude of circumferential movement thereof and three upstanding fingers, one of which is disposed to one side of said radial quadrant support, another between said support and one side of said levers and the other at the opposite side of said levers, one of said fingers having a transverse aperture above the quadrant and levers, and a lock including an element extending through said aperture to prevent unauthorized removal of said fingered body.

9. In a locking device, the combination with a motor vehicle steering wheel having spokes, and a throttle lever, a spark lever and a quadrant including a radial support thereabove, of a body having a portion disposed between spokes of said wheel to limit the amplitude of circumferential movement thereof and three upstanding fingers, one of which is disposed to one side of said radial quadrant support, another between said support and one side of said levers and the other at the opposite side of said levers, one of said fingers having a transverse aperture above the quadrant and levers, an element embracing said last two mentioned fingers above said levers but below said aperture and a lock including an element extending through said aperture to prevent unauthorized removal of said fingered body and embracing element.

10. As an article of manufacture, a locking device for motor vehicles formed of a single body of metal having an intermediate portion, three extensions from one side of said intermediate portion said three extensions in spaced apart relation providing two ways open at one end of the body for the reception of a quadrant section and control lever of the vehicle, one of said extensions having a transverse way for the reception of a padlock shackle, and a single extension at the other side of said intermediate portion adapted to extend between the spokes of the vehicle steering wheel.

ROBERT E. HARRIS.